(12) United States Patent
Dabek et al.

(10) Patent No.: US 8,376,191 B2
(45) Date of Patent: Feb. 19, 2013

(54) SUBMERGIBLE VOLUMETRIC FILLING DEVICE AND METHOD INCLUDING CONE-SHAPED SWITCHING VALVE CAPABILITIES

(75) Inventors: Jaroslaw Dabek, Lake Grove, NY (US); Syed Zaki Hossain, Hicksville, NY (US)

(73) Assignee: Modern Packaging Inc., Deer Park, NY (US)

( * ) Notice: Subject to any disclaimer, the term of this patent is extended or adjusted under 35 U.S.C. 154(b) by 671 days.

(21) Appl. No.: 12/569,067

(22) Filed: Sep. 29, 2009

(65) Prior Publication Data

US 2010/0078449 A1 Apr. 1, 2010

Related U.S. Application Data

(60) Provisional application No. 61/101,395, filed on Sep. 30, 2008.

(51) Int. Cl.
    *B67D 7/58* (2010.01)
(52) U.S. Cl. ............. 222/380; 222/1; 222/137; 222/309
(58) Field of Classification Search .............. 222/1, 135, 222/137, 354–355, 367–368, 425, 444, 363, 222/380, 309; 141/146, 392
See application file for complete search history.

(56) References Cited

U.S. PATENT DOCUMENTS

| 14,734 | A | * | 4/1856 | Palmer | 222/409 |
|---|---|---|---|---|---|
| 1,867,601 | A | * | 7/1932 | Stokes | 222/318 |
| 2,074,041 | A | * | 3/1937 | Baldwin | 222/444 |
| 2,464,030 | A | * | 3/1949 | Engstrom | 222/309 |
| 2,510,317 | A | * | 6/1950 | Perkins | 222/255 |
| 3,096,914 | A | * | 7/1963 | Kerr | 222/333 |
| 3,166,025 | A | * | 1/1965 | Hulse | 425/258 |
| 3,550,814 | A | * | 12/1970 | Von Lersner | 222/129.3 |
| 3,865,281 | A | * | 2/1975 | Byrd et al. | 222/252 |
| 3,982,033 | A | * | 9/1976 | Zito | 426/302 |
| 4,341,329 | A | * | 7/1982 | Kuemmerer et al. | 222/275 |
| 4,566,612 | A | * | 1/1986 | von Kreuter | 222/309 |
| 4,676,279 | A | * | 6/1987 | von Lersner | 141/1 |
| 5,052,591 | A | * | 10/1991 | Divall et al. | 222/135 |
| 5,127,547 | A | * | 7/1992 | Gerich | 222/55 |
| 5,141,165 | A | * | 8/1992 | Sharpless et al. | 239/752 |
| 5,172,835 | A | * | 12/1992 | Hudcovic et al. | 222/380 |
| 5,419,464 | A | * | 5/1995 | Ganrot et al. | 222/380 |
| 5,553,756 | A | * | 9/1996 | Topper et al. | 222/496 |
| 6,758,056 | B1 | * | 7/2004 | Cathenaut et al. | 62/345 |
| 7,743,798 | B2 | * | 6/2010 | Kunii et al. | 141/90 |

* cited by examiner

*Primary Examiner* — Frederick C. Nicolas
(74) *Attorney, Agent, or Firm* — Carter, DeLuca, Farrell & Schmidt, LLP (57) ABSTRACT

A dispensing system for supplying containers with a fluid material provided from a source is provided. The dispensing system includes a chamber configured to be connected to receive the fluid material from the source and a piston configured for motion between predetermined limits for establishing controlled volumes of the fluid material. The dispensing system further includes a nozzle configured to receive the controlled volumes of the fluid material and to discharge the controlled volumes of the fluid material into the containers and a switching valve positioned directly between the piston and the nozzle, the switching valve configured to include a lumen that moves from a first position to a second position to regulate the discharge of the controlled volumes of the fluid material.

17 Claims, 10 Drawing Sheets

SUBMERGIBLE VOLUMETRIC FILLING DEVICE AND METHOD INCLUDING CONE-SHAPED SWITCHING VALVE CAPABILITIES

CROSS-REFERENCE TO RELATED APPLICATIONS

This application claims priority to, and the benefit of, U.S. Provisional Patent Application Ser. No. 61/101,395 filed Sep. 30, 2008. The entire contents of the aforementioned application are incorporated by reference herein.

TECHNICAL FIELD

The present disclosure relates to bottling and packaging liquid mediums, and more particularly, to apparatuses and methods for dispensing liquid mediums of varying viscosity into a plurality of containers via a cone-shaped switching valve positioned between a piston and a nozzle.

BACKGROUND AND RELATED ART

In a number of industries, such as the agricultural and food, petroleum, pharmaceutical or chemical industries, it is often necessary to undertake the packaging of predetermined quantities of liquid or pasty, homogeneous or heterogeneous products intended for sale, this packaging requiring the transfer of products of more or less high viscosity from a storage container to a receptacle such as a plastic cup, a bottle, a jar, a can or the like. The filling of these receptacles is generally carried out in series, with the aid of machines incorporating at least one filling station supplied by at least one storage container, the receptacles passing one after another in front of the filling station at a predetermined rate.

In the bottling and packaging of liquid products, it is necessary to meter fairly precise quantities of product to comply with most state laws on labeling and packaging a product. Moreover, many problems exist with volumetric devices because of the nature of the product itself. For instance, some liquid products tend to expand when being handled either by dissolving air, by foaming or sudsing. Moreover, liquid products are quite often difficult to dispense from a volumetric device because of dripping or clinging to the side walls of the device. Further, many problems have been encountered in volumetric filling devices through the buildup of sediment or coatings on the surface so that the measured volume will vary through a work day. In the filling of containers from a volumetric metering device, production is quite often dependent on the speed with which the container is filled.

To comply with regulations, it is necessary to establish accurately the quantity of product allowed to enter each receptacle. In particular, in the case of serial filling, it is necessary that quantities of products allowed to enter all the receptacles correspond to a stated volume or weight, this volume of this weight being capable of appearing on a label affixed to each receptacle. However, problems still arise when attempting to fill containers. In particular, in high-speed liquid/fluid dispensing mechanisms imprecise (excess or deficient) quantities of liquid/fluid may be dispersed from a nozzle into a plurality of containers.

SUMMARY

The present disclosure is related to a dispensing system for supplying containers with a fluid material provided from a source. The system includes a chamber configured to be connected to receive the fluid material from the source; a piston configured for motion between predetermined limits for establishing controlled volumes of the fluid material; a nozzle configured to receive the controlled volumes of the fluid material and to discharge the controlled volumes of the fluid material into the containers and a switching valve positioned directly between the piston and the nozzle, the switching valve configured to include a lumen that moves from a first position to a second position to regulate the discharge of the controlled volumes of the fluid material.

According to another aspect of the present disclosure, a method of supplying containers with a fluid material from a source is provided. The method further provides a dispensing system including a chamber configured to be connected to receive the fluid material from the source; a piston configured for motion between predetermined limits for establishing controlled volumes of the fluid material; a nozzle configured to receive the controlled volumes of the fluid material and to discharge the controlled volumes of the fluid material into the containers and a switching valve positioned directly between the piston and the nozzle, the switching valve configured to include a lumen that moves from a first position to a second position to regulate the discharge of the controlled volumes of the fluid material.

According to another aspect of the present disclosure, a volumetric filling device is provided including a chamber configured to hold a fluid and a cone-shaped switching valve in fluid communication with a piston and a nozzle, the cone-shaped switching valve adapted to be actuated from a closed position to an open position to regulate the fluid received by the nozzle.

All of the principles and features and their concomitant advantages may be more fully understood through understanding of the embodiments hereinafter described in detail, with reference to the accompanying drawings.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

The foregoing and other features of the present disclosure will become apparent to one skilled in the art to which the present disclosure relates upon consideration of the following description of the disclosure with reference to the accompanying drawings, wherein.

DETAILED DESCRIPTION OF THE EMBODIMENTS

The present disclosure relates to a volumetric filling device that provides for high filling speed and for fine volumetric precision and accuracy. Accurate filling of containers requires close control of liquid at all points in the system downstream from the metering device, to prevent loss of liquid to the surrounding environment or otherwise so that all liquid metered actually enters and remains in the bottle/container and no unmetered liquid enters the bottle/container.

The present disclosure further relates to an improved dispensing system for automatically dispensing a predetermined quantity of a viscous or non-uniform substance/fluid/material. In particular, an improved dispensing system is provided for conveying a predetermined quantity of a viscous substance or the like, wherein such system utilizes a cone-shaped switching valve located directly between the piston and the nozzle for providing accurate quantities of liquid/fluid to a plurality of containers/bottles regardless of the viscosity of the liquid to be delivered.

Prior to describing the present disclosure in further detail, it will first be helpful to define various terms that will be used throughout the following discussion. For example:

A volumetric liquid flow rate is conventionally expressed and defined as units of volume in units of time as measured at a defined point or location in a liquid flow conduit or container. For example, fluid flow rates may be expressed in gallons per minute, milliliters per millisecond, liters per second, and ounces per second. Volumetric flow rate is independent of the geometry of the flow conduit in which the flow occurs and is measured. For example, the volumetric flow rate measured to be at 180 milliliters per second in a flow tube having hydraulic flow and an internal diameter of five centimeters is identical to the volumetric flow rate measured to be at 180 milliliters per second in a flow tube having hydraulic flow and an internal diameter of one centimeter. Thus, it can be stated that volumetric liquid flow rate is independent of the geometry of the flow conduit in which the flow occurs and is measured.

As used in this description and in the appended claims, the word "container" does not necessarily refer to a rigid or a somewhat deformable structure, such as a "bottle," "bottle portion," or "bottle half" for containing liquid. Rather, the word "container" in the present disclosure and in the appended claims may also mean a "box," "packet," "bag," "portion of a bag," "pocket of a bag," or any such deformable structure for containing liquid. The terms "container" and "bottle" may be used interchangeably throughout the present disclosure.

Embodiments of the presently disclosed apparatuses and methods for dispensing liquids or fluids with varying viscosities, or semi-solid materials will now be described in detail with reference to the appended drawings, in which like reference numerals designate identical or corresponding elements in each of the several views.

With reference to FIGS. 1B-5B, a cross-sectional view illustrating a dispensing system incorporating a cone-shaped switching valve, in accordance with the present disclosure is presented.

Figure 1A:
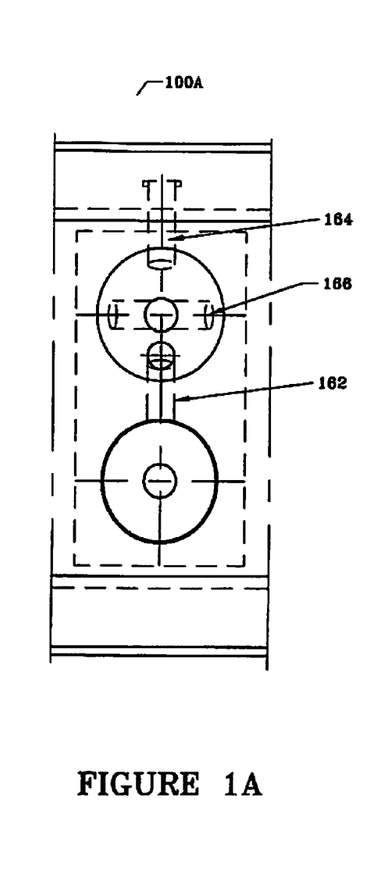
FIGS. 1A and 1B are cross-sectional views illustrating a dispensing system including a cone-shaped switching valve, where the piston is in a first position and a lumen is in a closed position, in accordance with the present disclosure.
Figure 1B:
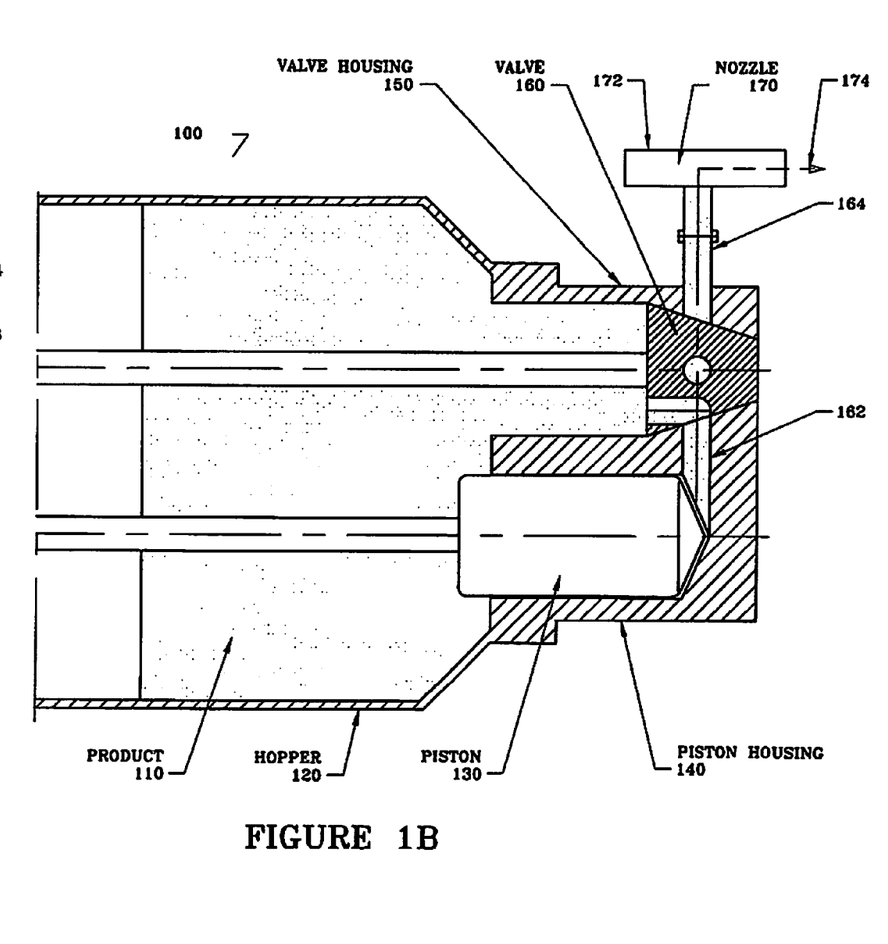

The dispensing system 100 includes a product 110, a hopper 120, a piston 130, a piston housing 140, a valve housing 150, a valve 160, a nozzle 170, a nozzle channel 172, and a nozzle opening 174. The valve 160 further includes a valve inlet port 162 and a valve outlet port 164. The top cross-sectional view 100A of the valve 160 depicts the valve inlet port 162 and the valve outlet port 164 in cooperation with a lumen 166.

Volumetric filling is commonly implemented in semi-automatic or automatic filling systems wherein empty containers are carried by conveyors or other transport mechanisms to filling positions. Once the containers reach the filling positions, they are stopped, filled to the desired degree by filling heads (e.g., nozzles or other dispensing apparatus), and then released upon completion of the fill. In other instances, no container transport mechanisms are utilized and the containers are simply placed by hand at the filling station, filled, and then removed by hand after filling.

In volumetric filling (also known as volume-metered filling), a set volume of fluid is dispensed into a container. For example, a chamber is set to a desired volume, the chamber is filled with fluid, and the contents of the chamber are then dispensed into a container. The chamber is generally provided by a cylinder which is emptied by a piston. Volumetric filling is subject to the disadvantages that filling accuracy is limited by the accuracy of the control of the chamber volume, and filling speed is limited by the time necessary for refilling the chamber. Thus, in accordance with the present disclosure, a cone-shaped switching valve is incorporated within the volumetric filling system or dispensing system 100 to overcome deficiencies related to prior systems.

The hopper 120 stores the product 110, and the product 110 branches or travels or is guided therethrough from the hopper 120 via a piston 130 and a valve 160 to the nozzle 170. The dispensing system 100 uses one or more filling nozzles 170 which are opened and closed by opening-and-closing valves (e.g., switching valve 160) that are raised and lowered only in the discharge port provided at the lower ends of the nozzle 170.

The hopper 120 is provided for holding the product 110 (e.g., fluid or liquid or semi-solid substance or semi-solid materials or fluid material) and has a receiving port for receiving the product 110. The hopper 120 may be generally described as being of rectangular shaped, block-form, which is preferably fabricated from a thermoplastic, synthetic resin that is of a type that, even with a relatively thin-wall construction, the container may be semi-rigid and substantially self-supporting when either empty or filled. One corner of the hopper 120 may be formed at an angle and may be provided with a filling opening that may be adapted to receive a closure (not shown) which may be a cap of the valved dispensing type. A feeder (not shown) may be used for filling product into the hopper 120, which is controlled between low and fast feed rates by one or more switches (not shown).

The hopper 120 has been described as a single hopper. However, alternatively, the hopper 120 may be divided by a perforated partition making it possible to keep on one side a heterogeneous product and to select from the other side of the partition a homogeneous product, the side containing the heterogeneous product being capable of being coupled to the device for volumetric metering while the side containing the homogeneous product is capable of being coupled to the device for weight metering. Thus, the hopper 120 may be divided into a plurality of portions or sections or chambers or regions for holding and dispensing a plurality of different products 110 in various predetermined or preset time intervals.

The piston 130 may be any type of piston contemplated by one skilled in the art, such as a pneumatic piston or a hydraulic piston. The piston 130 may be in operable communication with a piston valve (not shown), which is a device used to control the motion of the product 110 flowing along a tube or pipe by means of the linear motion of the piston 130 within a chamber or cylinder or piston housing 140. The dispensing system 100 is described with respect to one piston 130. However, it is contemplated that a plurality of pistons 130 may be provided in series or in parallel that operate in unison or separately (as distinct components/elements) in order to dispense product 110 from the nozzle 170.

In operation, the piston 130 is drawn back (FIG. 2A, arrows "A") in its cylinder so that the product 110 is drawn into the cylinder. A rotary valve (not shown) may be used to change the piston position so that the product 110 is pushed out of the nozzle 170 instead of back into the hopper 120. The piston 130 may be moved downwardly (FIG. 4A, arrows "B") into the piston housing 140 to push the viscous product 110 contained therein toward the nozzle 170. By means of a pressure exerted on the piston 130, the container holding the piston 130 is biased for movement (upward "A" or downward "B"). According to one of the aspects of the present disclosure, the piston 130 may be driven in accordance with an operative stroke profile.

Figure 2A:
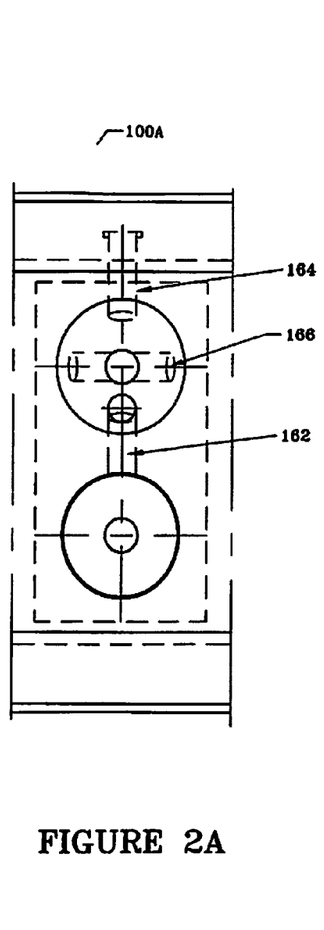
FIGS. 2A and 2B are cross-sectional views illustrating a dispensing system including a cone-shaped switching valve, where the piston is in a second position and a lumen is in a closed position, in accordance with the present disclosure.
Figure 2B:
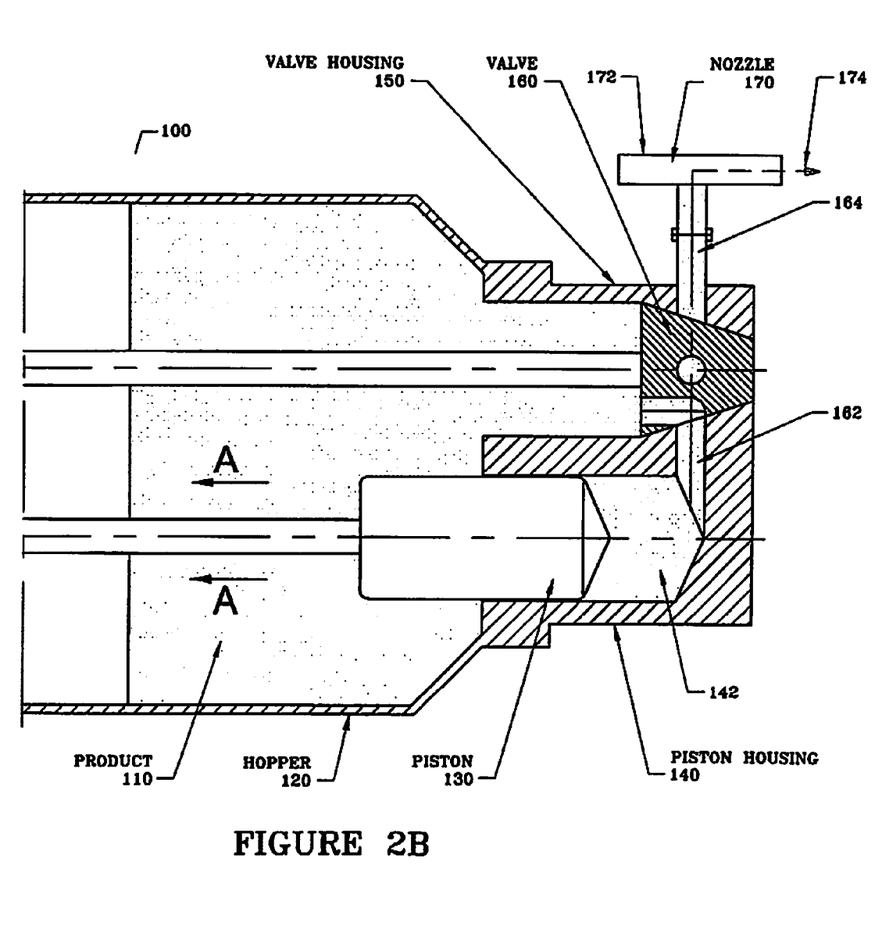
Figure 3A:
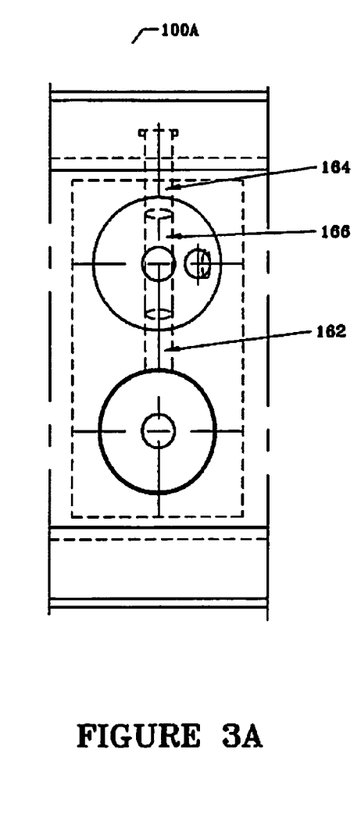
FIGS. 3A and 3B are cross-sectional views illustrating a dispensing system including a cone-shaped switching valve, where the piston is in a second position and the lumen is in an open position, in accordance with the present disclosure.
Figure 3B:
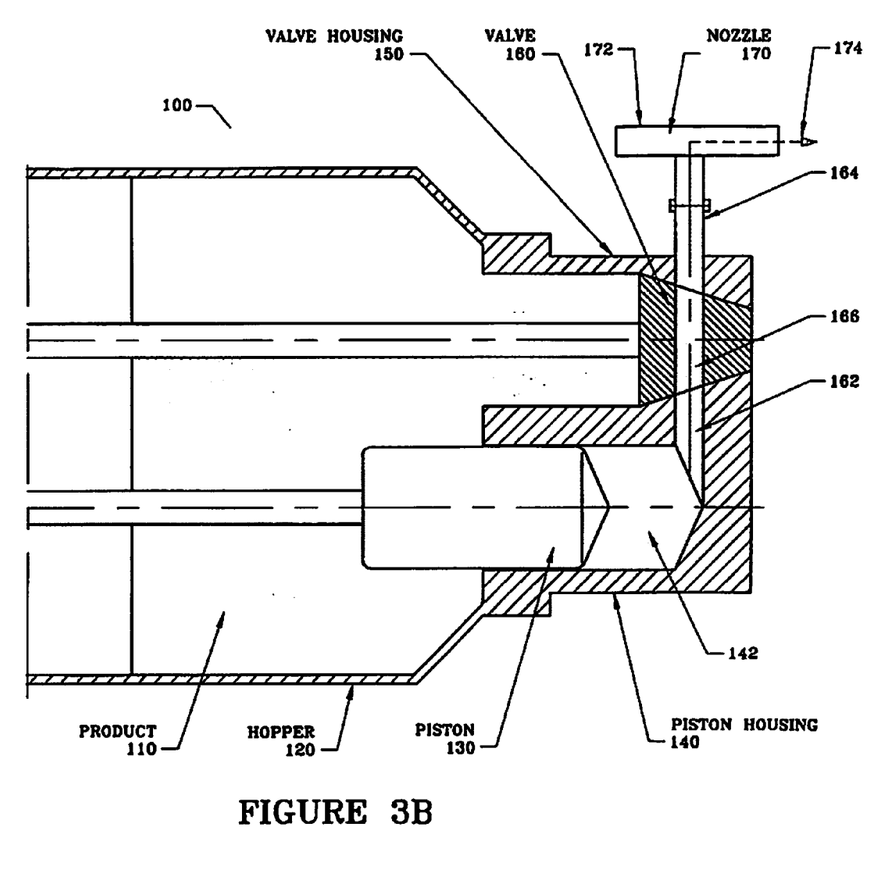
Figure 4A:
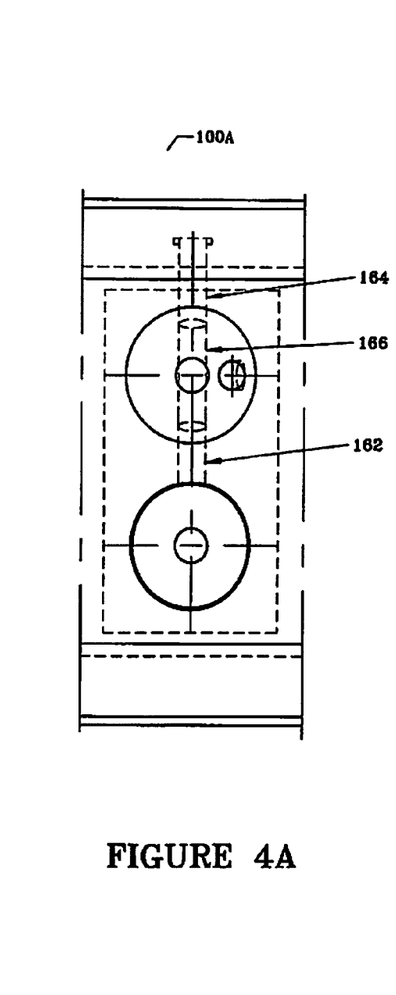
FIGS. 4A and 4B are cross-sectional views illustrating a dispensing system including a cone-shaped switching valve, where the piston is back in the initial first position, the lumen is in an open position and liquid flows out the nozzle, in accordance with the present disclosure.
Figure 4B:
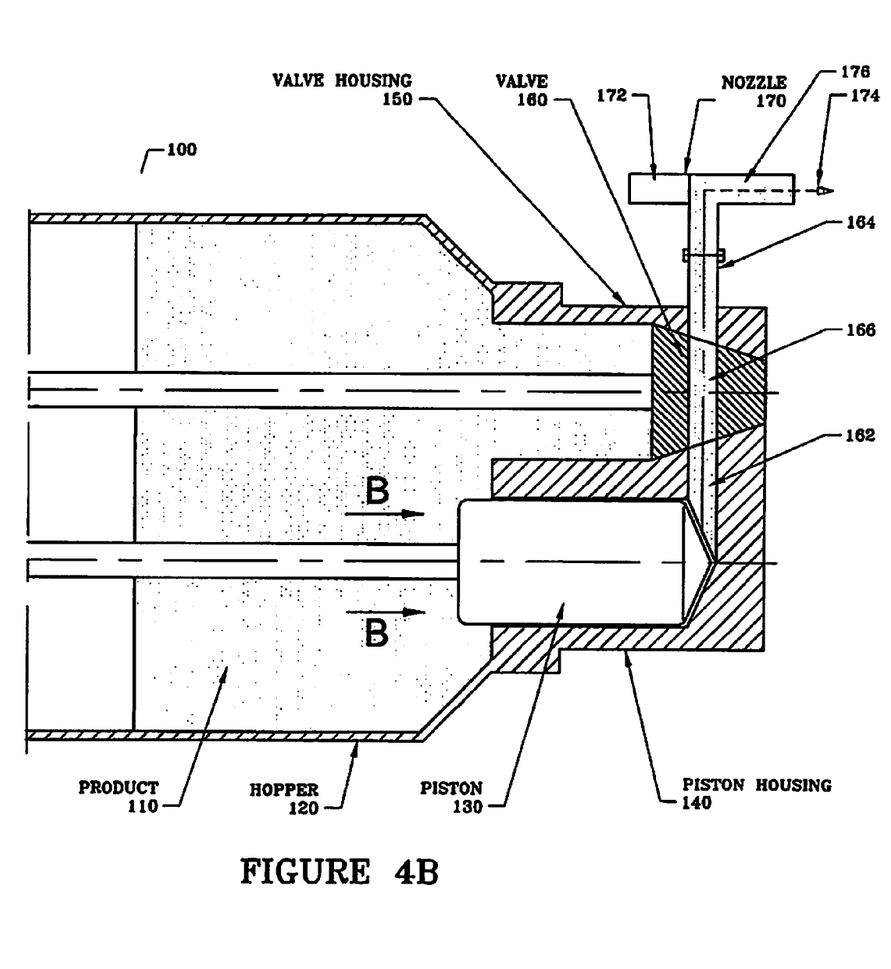
Figure 5A:
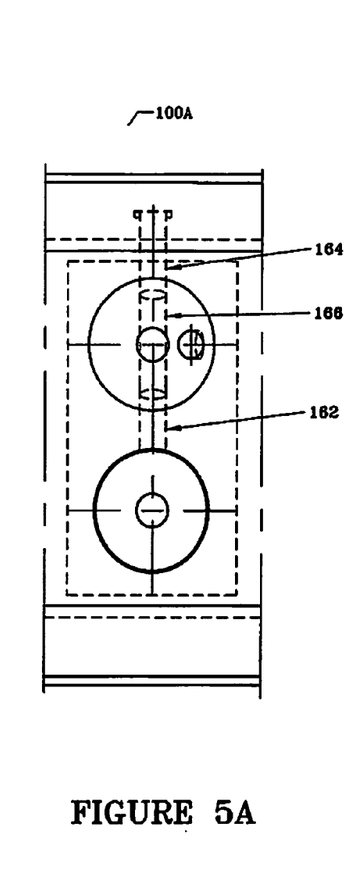
FIGS. 5A and 5B are cross-sectional views illustrating a dispensing system including a cone-shaped switching valve, where the piston is back in an initial first position and the lumen is in an open position, in accordance with the present disclosure.
Figure 5B:
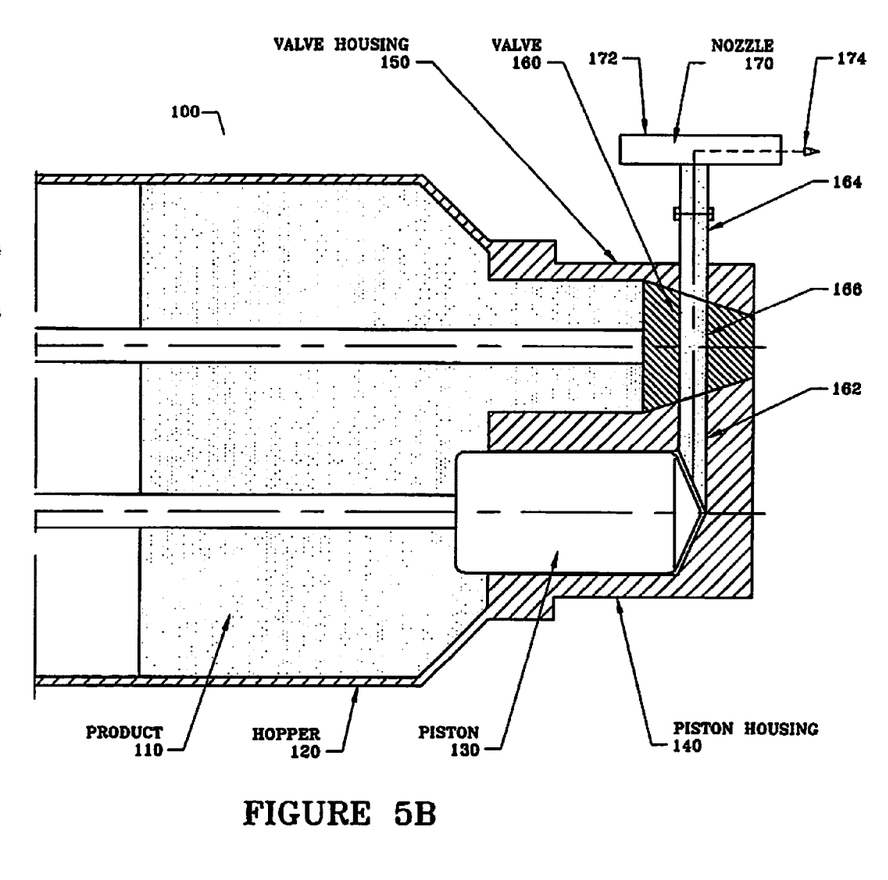
Figure 6A:
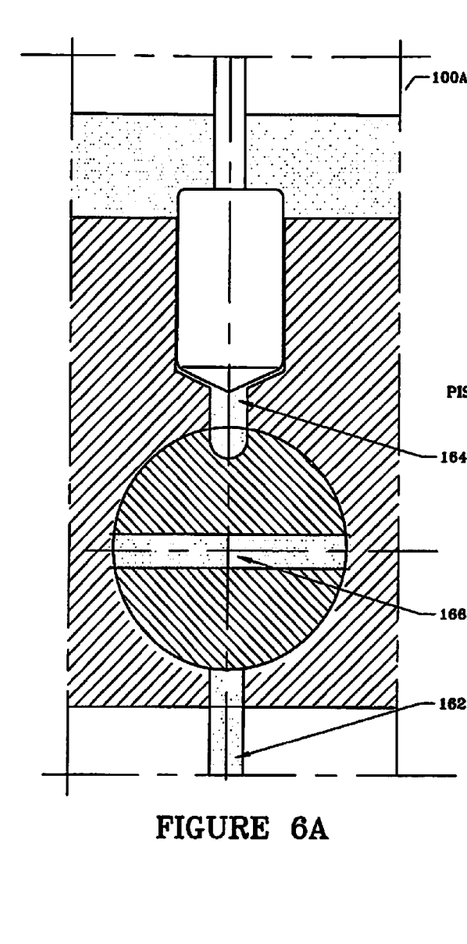
FIGS. 6A and 6B are cross-sectional views illustrating a dispensing system including a horizontal cone-shaped switching valve, where the piston is in a first position and a lumen is in a closed position, in accordance with the present disclosure.
Figure 6B:
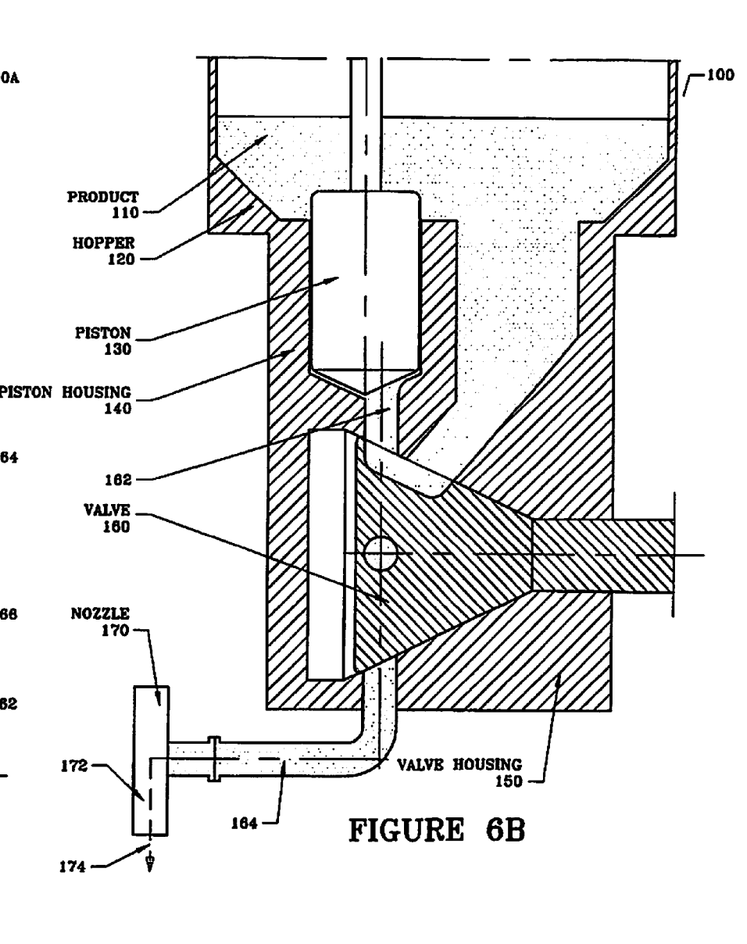
Figure 7A:
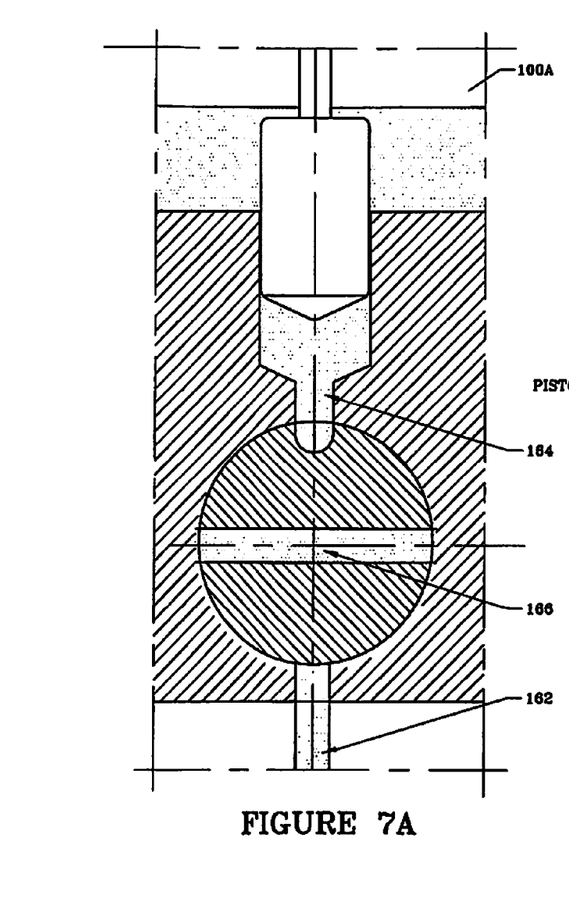
FIGS. 7A and 7B are cross-sectional views illustrating a dispensing system including a horizontal cone-shaped switching valve, where the piston is in a second position and a lumen is in a closed position, in accordance with the present disclosure.
Figure 7B:
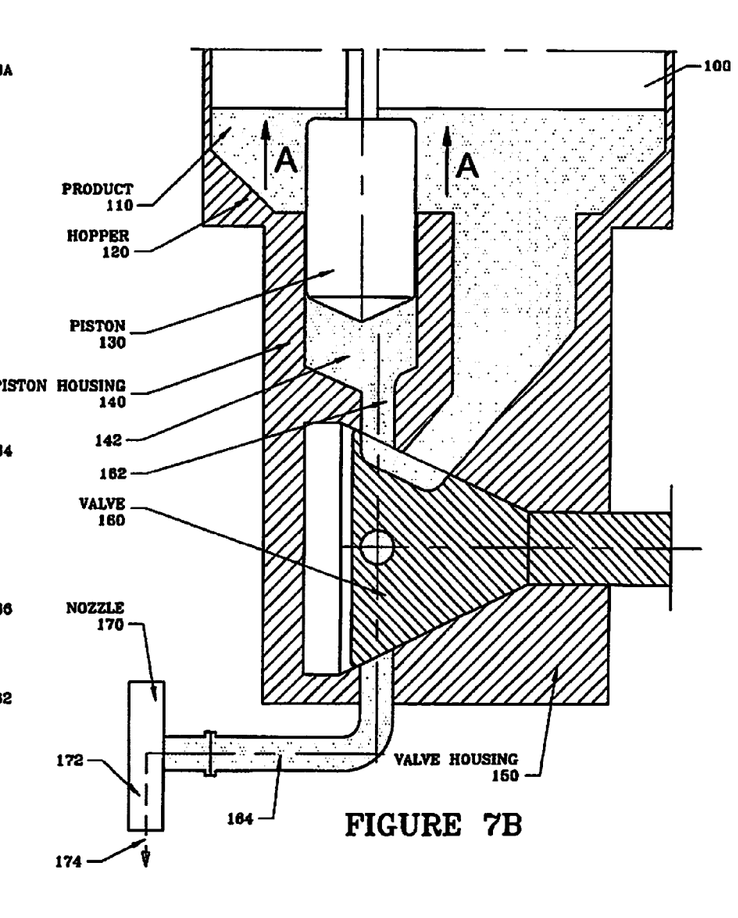
Figure 8A:
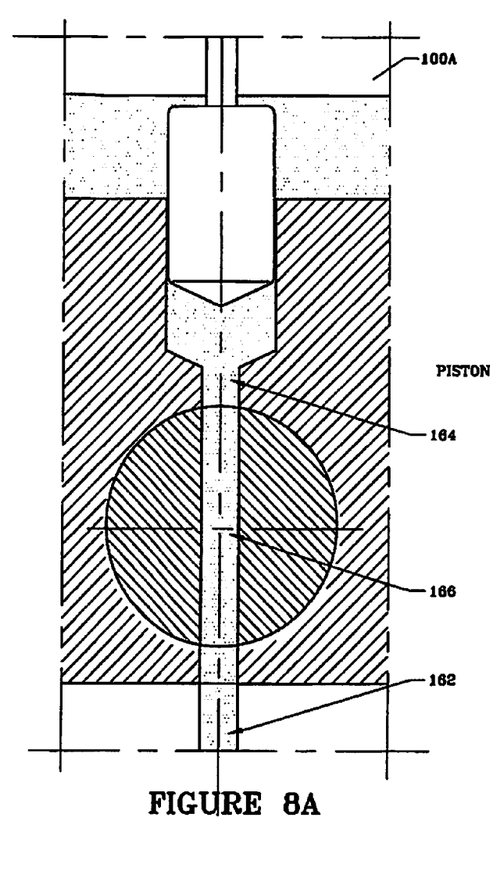
FIGS. 8A and 8B are cross-sectional views illustrating a dispensing system including a horizontal cone-shaped switching valve, where the piston is in a second position and the lumen is in an open position, in accordance with the present disclosure.
Figure 8B:
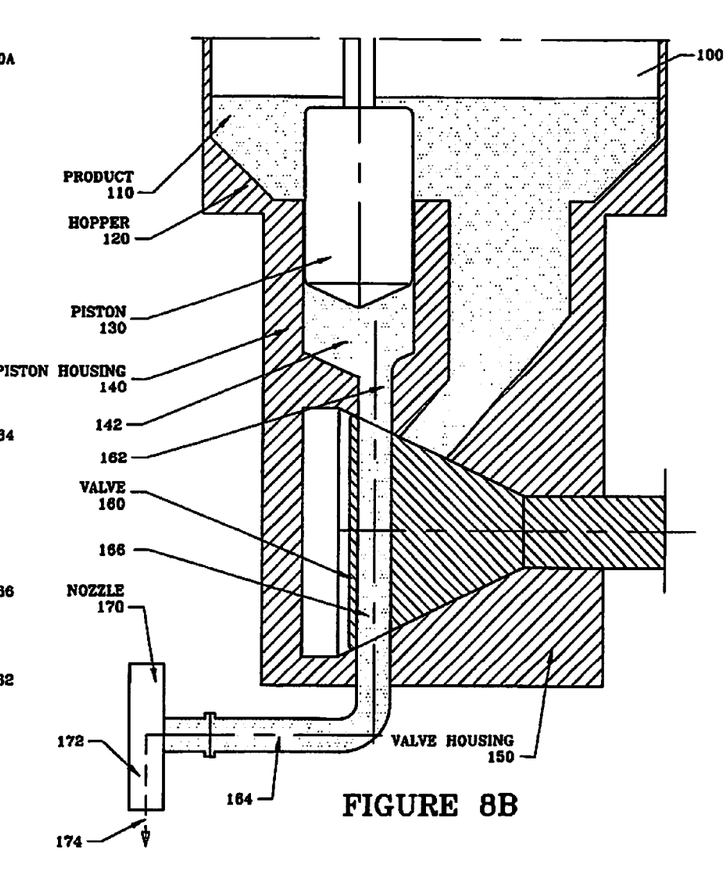
Figure 9A:
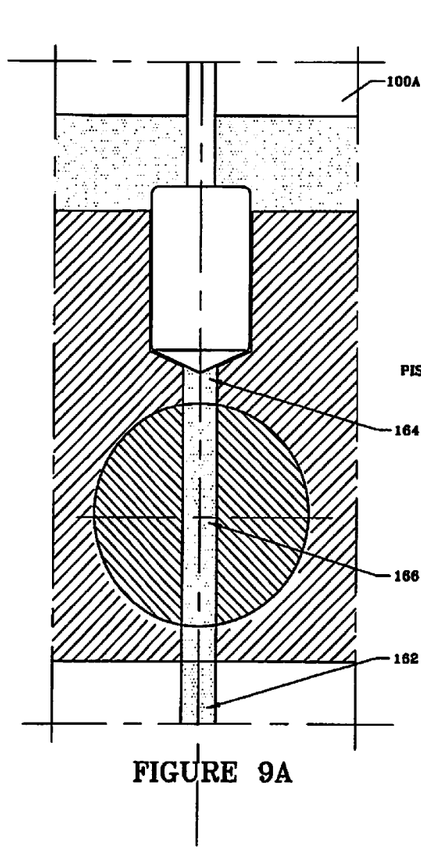
FIGS. 9A and 9B are cross-sectional views illustrating a dispensing system including a horizontal cone-shaped switching valve, where the piston is back in the initial first position, the lumen is in an open position and liquid flows out the nozzle, in accordance with the present disclosure.
Figure 9B:
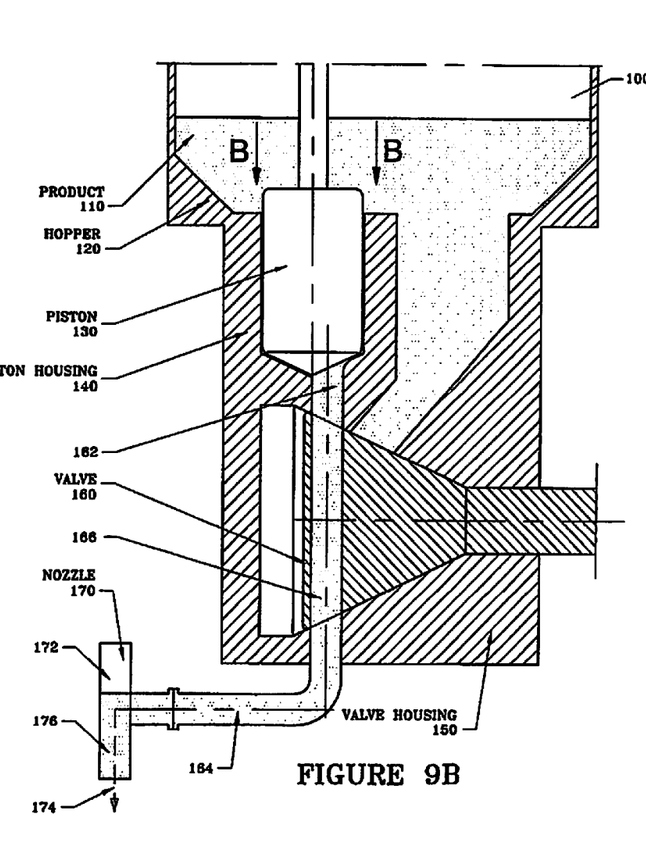
Figure 10A:
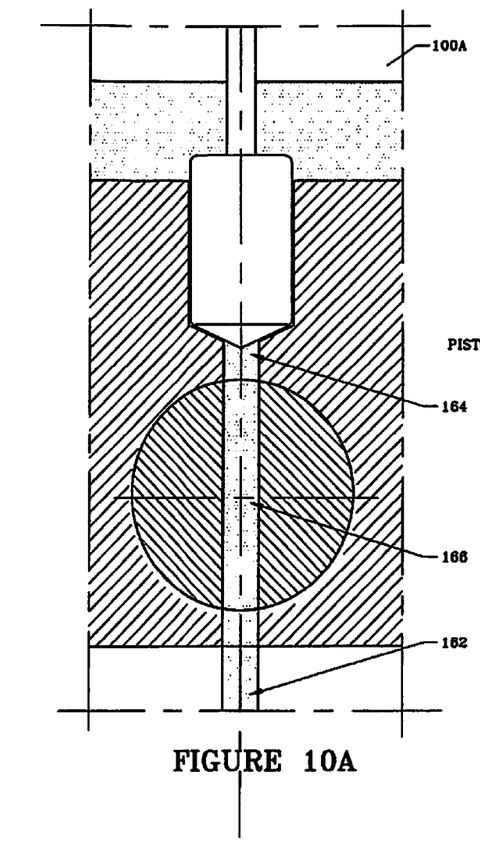
FIGS. 10A and 10B are cross-sectional views illustrating a dispensing system including a horizontal cone-shaped switching valve, where the piston is back in an initial first position and the lumen is in an open position, in accordance with the present disclosure.
Figure 10B:
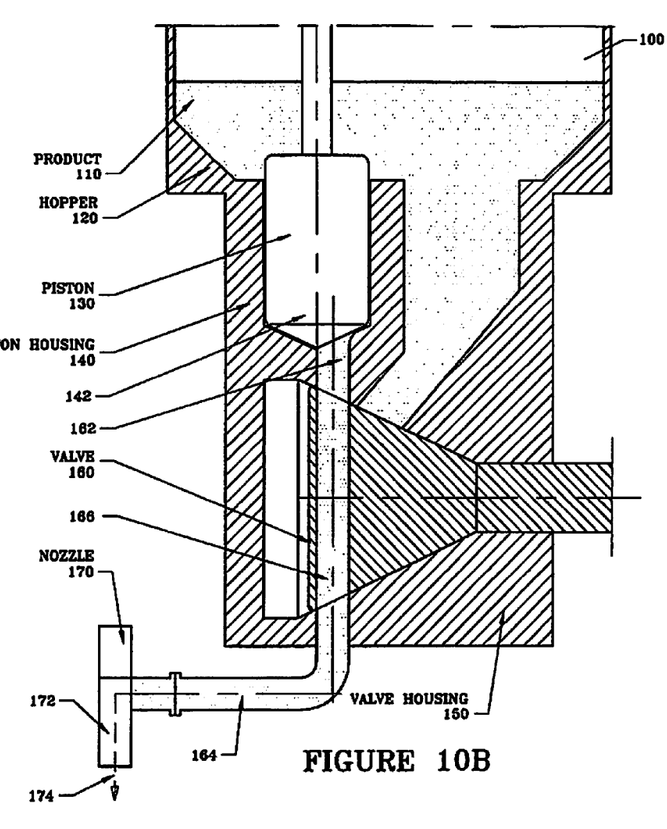

For example, in a first position, the outlet port of the hopper 120 is placed in communication with a pump chamber or product cylinder or piston housing 140 in which a piston reciprocates to draw product 110 from the hopper 120 on a first stroke and force the product 110 out through the valve inlet port 162 on a second stroke. In a second position, the second stroke forces product 110 out through the piston housing 140 to a product chamber 142 (see FIGS. 2A and 3A). The first position of the piston 130 is illustrated in FIG. 1A, whereas the second position of the piston 130 is illustrated in FIGS. 2A and 3A. FIG. 4A illustrates the piston 130 back in its original or initial first position. FIGS. 1A-4A illustrate how piston 130 is configured for motion between predetermined limits for establishing controlled volumes of the fluid material or product 110.

Additionally, the stroke of the piston 130 is adjustable to meter the amount of product 110 drawn into the product chamber 142 from the hopper 120 as well as the amount ultimately dispensed through the nozzle 170. In adjusting for the volume of product 110 to be dispensed, the stroke of the piston 130 is adjusted. For instance, a valve spool (not shown) of the piston 130 may be constantly timed with respect to the discharge or dispensing stroke of the piston 130, so that only one degree of adjustment is required for an accurate volumetric discharge of the product 110. The valve spool may be one element of any type of "flow controller" located within the piston housing 140.

The piston 130 may include any type of "flow controller" that may be defined to mean a structure or device having an intended purpose of altering, establishing, or defining the volumetric flow rate of a liquid. Additionally, the "controller" may be defined as a volumetric liquid flow rate defining device, which may be automatically controlled and adjusted in its flow rate control characteristics in response to some externally derived signal, command, or event. Thus, a flow controller may be thought of as an active or interactive or dynamic volumetric liquid flow control device.

The valve 160 is depicted as a cone-shaped switching valve. Of course, one skilled in the art may contemplate a plurality of different shapes for the switching valve 160. The switching valve 160 is positioned directly between the piston 130 and the nozzle 170, the switching valve 160 being configured to include a lumen 166 that moves from a first position (see FIG. 2A) to a second position (see FIG. 3A) to regulate the discharge of the controlled volumes of the fluid material or product 110. It is also noted that the piston 130 and the switching valve 160 are submerged in the fluid material or product 110 within the chamber or hopper 120 and that the piston 130 is positioned in a first housing or piston housing 140 within the chamber or hopper 120 and the switching valve 160 is positioned in a second housing or valve housing 150 within the chamber or hopper 120.

The switching valve 160 may include a passage for the product 110 and may be connected to a pressure means to link the outlet of the product chamber 142 to the nozzle 170. The switching valve 160 is positioned directly between the piston 130 and the nozzle 170. The switching valve 160 is connected to the piston 130 via the valve inlet port 162 and is connected to the nozzle 170 via the valve outlet port 164. The orientation of the switching valve 160 is such that the narrow portion of the cone is facing away from the hopper 120, whereas the wide portion of the cone is facing the hopper 120. In other words, the cone-shaped switching valve 160 may have a top surface and a bottom surface, where the top surface is greater than the bottom surface, and the top surface of the switching valve 160 may face the nozzle 170 and the bottom surface of the switching valve 160 may face the piston 130 when the switching member 166 of the switching valve 160 moves from the first position (see FIG. 2A) to the second position (see FIG. 3A) to permit the discharge of the controlled volumes of the product 110.

The switching valve 160 further includes a lumen 166 that is movable from a first position wherein the product chamber 142 (see FIG. 2A) is empty to a second position wherein the product chamber 142 is filled to its predetermined or preset volume. The ingress of the product 110 into the product chamber 142 causes the switching member 166 to move from the first position (non-contact position) to the second position (contact position). This is shown with respect to the top cross-sectional view 100A. The lumen 166 may rotate from the closed position to the open position by approximately 90° degrees. When the switching member 166 is in the second position (contact position), an electrical circuit (not shown) may be caused to close, thus triggering a signal to activate the valve inlet port 162 and the valve outlet port 164 so that product 110 flows through the valve inlet port 162 to the valve outlet port 164 and into the nozzle 170. The product 110 may then be discharged from the nozzle 170.

The nozzle 170 includes a nozzle channel 172 and a nozzle opening 174, the cross-section of the nozzle channel 172 being larger than that of the nozzle opening 174. The opening of the nozzle channel 172 located opposite the nozzle opening 174 may be referred to as an actuating opening. The nozzle opening 174 may be dimensioned such that, in a state of rest, the surface tension of the product 110 at the nozzle opening 174 prevents flowing out of the product 110. The nozzle channel 172 may be implemented such that it is in a completely filled state 176 (see FIG. 4A) with the product 110 due to a capillary force. The nozzle 170 is in fluid communication with the valve 160, the piston 130, and the hopper 120. Of course, a plurality of nozzles 170 may be connected to a plurality of valves 160 that are further connected to a plurality of pistons 130. One skilled in the art may contemplate using any number of the elements/components described in the present disclosure in order to assemble a plurality of different configurations or structures or systems.

In an alternative embodiment, as illustrated with respect to FIGS. 6A-10A and FIGS. 6B-10B, the piston 130 may be positioned in a horizontal direction, as opposed to a vertical direction (see FIGS. 1A-5A and FIGS. 1B-5B). Of course, one skilled in the art may contemplate positioning piston 130 in any number of different directional orientations. The piston 130 may be positioned anywhere between 0° and 180° with respect to the valve 160 or the hopper 120 or any other components of the system 100. For example, the piston 130 may be positioned at a 45° angle, for instance, to accommodate other components within the system 100. The piston 130 may be located in close proximity to the valve 160 or may be positioned at a distance with respect to valve 160 within the hopper 120. Additionally, all the components within the system 100 may be positioned in any orientation with respect to each other and at any distance with respect to each other in any manner as contemplated by one skilled in the art.

In additional embodiments, a user interface in conjunction with an electronic controller may be provided for allowing the dispensing system 100 to accommodate varying characteristics associated with dispensing of product 110. The user interface typically includes one or more keypads that include one or more indicia that signify, for example, different sized containers, product selections, and the like. Keypads may be coupled via ribbon cable to a circuit board, which is further coupled to an input/output connector that is coupled to a processor. In this configuration, when a user selects one of the keypads, the user interface sends data or information to the processor that indicates a particular characteristic of the product dispense cycle, such as, the size of the receptacle. The user interface may also include additional keypads, when selected begin a priming operation of the dispensing system. In addition, the user interface may provide for additional keypads that include additional user-selectable indicia such as increasing or decreasing the amount of product 110.

The user interface may also include a number of lights, which may include LEDs (light emitting diodes) or appropriate bulbs, which provide the user with a visual indication if the dispensing system 100 experiences a change, for example, in operating conditions, such as low flow rate, near empty condition of the product source, or any other user-defined condition. In addition, the user interface may include one or more displays that may provide the user with data concerning the operation of the dispensing system 100.

Moreover, the dispensing system 100 may include temperature and pressure sensors that allow the electronic controller to supervise and manage an alarm function for these variables. In both cases, minimum and maximum values may be set, reflecting a bandwidth within which product 110 may be dispensed with satisfactory results. When pressure is alarmed, a message is annunciated or displayed indicating whether it is too high or too low. In either case, it signifies that the flow controller cannot further compensate for the pressure change in order to hold the volumetric flow rate stable to maintain dose size parameters. As with all dispenser alarm functions, temperature and pressure events may be time stamped, logged, and retrieved for analysis.

Throughout this specification, numerous references to the function, nature, and operation of the product dispenser electronic controller have been made, and various aspects of its features and capabilities have been discussed and explained. The electronic controller has control functions, data grouping functions, data logging functions, computation functions, input-output functions, alarm functions, and maintenance functions. The electronic controller may configure the nozzle 170 for operation based on all of the diverse variables associated with the installation and operation of the dispensing system 100. The configuration(s) presented in the exemplary embodiments may constitute automatic electronic entry of control functions and parameters, automatic adjustment and configuration of the volumetric flow controller, and motion configuration of the nozzle 170 to provide desired volumetric flow rate or rates, as well as a series of prompts with correct values or instructions for manual or automatic configuration.

In addition to the numerous alarm parameters and functions previously discussed, the electronic controller may monitor power supply voltages, battery supply conditions in portable applications, and it may track the operating cycles of the dispensing system 100 and store these totals such that proper maintenance intervals and life cycle replacements may be scheduled and conducted. A real time clock may also schedule and annunciate time based events, such as calendar based maintenance schedules. The electronic controller, in combination with the volumetric flow rate control device provides a capability of tracking and recording product usage for report and analysis purposes.

Moreover, the electronic controller enables bidirectional communication using all data transmission modes and media to personal computers (PCs) of all types, local area networks, server based systems, handheld and portable digital assistants (PDAs), as well as dedicated handheld devices.

Another aspect of dispenser system 100 is the role of the electronic controller in controlling cleaning cycles of the system 100. The controller may measure and define cleaning intervals based on operating cycles or elapsed time. It may also control and automate the cleaning function, including control of flow sequences, flow durations, and flow patterns. The volumetric flow rate control device allows the volume of cleaning liquids used in a cleaning sequence to be defined, thus assuring cleaning effectiveness. The sequence(s) of actuations, durations, and volume of flow that constitutes a clean-in-place sequence may be stored in the electronic controller for use with each cleaning event.

The present disclosure is obviously susceptible to several variants of practical realization as to what relates to the structural proportioning or the technological choices of the materials to be used. It is also evident that are to be considered as being a part of the present disclosure all those devices to regulate from the outside the capacity of the volumetric chamber of the metering devices of a filler without venting tube and without o-rings, and equipped with magnets, internal and external, to actuate the movements of the internal piston of a cylindrical volumetric chamber or hopper 120.

The present disclosure also includes as an additional embodiment a computer-readable medium which stores programmable instructions configured for being executed by at least one processor for performing the product dispensing methods described herein according to the present disclosure. The computer-readable medium may include flash memory, CD-ROM, a hard drive, etc.

Having described the disclosure above, various modifications of the techniques, procedures, material and equipment will be apparent to those in the art. It is intended that all such variations within the scope and spirit of the appended claims be embraced thereby.

It will be understood that various modifications may be made to the embodiments of the presently disclosed dispensing systems. Therefore, the above description should not be construed as limiting, but merely as exemplifications of embodiments. Those skilled in the art will envision other modifications within the scope and spirit of the present disclosure.

What is claimed is:

1. A dispensing system for supplying containers with a fluid material provided from a source, the system comprising:
    a chamber configured to be connected to receive the fluid material from the source;
    a piston configured for motion between predetermined limits for establishing controlled volumes of the fluid material;
    a nozzle configured to receive the controlled volumes of the fluid material and to discharge the controlled volumes of the fluid material into the containers; and
    a switching valve positioned directly between the piston and the nozzle, the switching valve configured to include a lumen that moves from a first position to a second position to regulate the discharge of the controlled volumes of the fluid material;
    wherein the piston and the switching valve are fully submerged in the fluid material within the chamber, such that the fluid material continuously and completely surrounds the piston and the switching valve.

2. The system according to claim 1, wherein the piston is positioned in a first housing within the chamber and the switching valve is positioned in a second housing within the chamber.

3. The system according to claim 1, wherein the first position of the lumen is a closed position and the second position of the lumen is an open position.

4. The system according to claim 3, wherein the lumen rotates from the closed position to the open position by approximately 90° degrees.

5. The system according to claim 1, wherein the switching valve is a cone-shaped switching valve.

6. The system according to claim 5, wherein the cone-shaped switching valve has a top surface and a bottom surface, where the top surface is greater than the bottom surface.

7. The system according to claim 6, wherein the top surface of the switching valve faces the nozzle and the bottom surface of the switching valve faces the piston when the switching valve moves from the first position to the second position to permit the discharge of the controlled volumes of the fluid material.

8. A method of supplying containers with a fluid material provided from a source, the method comprising:
    providing a dispensing system, comprising:
        a chamber configured to be connected to receive the fluid material from the source;
        a piston configured for motion between predetermined limits for establishing controlled volumes of the fluid material;
        a nozzle configured to receive the controlled volumes of the fluid material and to discharge the controlled volumes of the fluid material into the containers;
        a switching valve positioned directly between the piston and the nozzle, the switching valve configured to include a lumen that moves from a first position to a second position to regulate the discharge of the controlled volumes of the fluid material; and
        fully submerging the piston and the switching valve in the fluid material within the chamber, such that the fluid material continuously and completely surrounds the piston and the switching valve.

9. The method according to claim 8, further comprising positioning the piston in a first housing within the chamber and positioning the switching valve in a second housing within the chamber.

10. The method according to claim 8, wherein the first position of the lumen is a closed position and the second position of the lumen is an open position.

11. The method according to claim 10, further comprising rotating the lumen from the closed position to the open position by approximately 90° degrees.

12. The method according to claim 8, wherein the switching valve is a cone-shaped switching valve.

13. The method according to claim 12, wherein the cone-shaped switching valve has a top surface and a bottom surface, where the top surface is greater than the bottom surface.

14. The method according to claim 13, wherein the top surface of the switching valve faces the nozzle and the bottom surface of the switching valve faces the piston when the switching valve moves from the first position to the second position to permit the discharge of the controlled volumes of the fluid material.

15. A volumetric filling device, comprising:
    a chamber configured to hold a fluid; and
    a cone-shaped switching valve in fluid communication with a piston and a nozzle, the cone-shaped switching valve adapted to be actuated from a closed position to an open position to regulate the fluid received by the nozzle;
    wherein the piston and the cone-shaped switching valve are fully submerged in the fluid within the chamber, such that the fluid continuously and completely surrounds the piston and the cone-shaped switching valve.

16. The volumetric filling device according to claim 15, wherein the piston is positioned in a first housing within the chamber and the cone-shaped switching valve is positioned in a second housing within the chamber, where the first housing and the second housing are adjacent to each other.

17. The volumetric filling device according to claim 15, wherein the cone-shaped switching valve is configured to include a lumen that rotates from the closed position to the open position by approximately 90° degrees.

* * * * *